UNITED STATES PATENT OFFICE.

SAMUEL L. DANA, OF LOWELL, MASSACHUSETTS, ASSIGNOR TO PROPRIETORS OF LOCKS AND CANALS ON MERRIMAC RIVER.

IMPROVEMENT IN PURIFYING ROSIN-OIL.

Specification forming part of Letters Patent No. 9,680, dated April 19, 1853.

*To all whom it may concern:*

Be it known that I, SAMUEL L. DANA, of the city of Lowell, in the county of Middlesex and Commonwealth of Massachusetts, chemist, have invented a new and useful Preparation of Rosin-Oil, which I denominate the "Deodorized Rosin-Oil," the same being a preparation of rosin-oil free from the peculiar and offensive odor which characterizes the rosin-oil of commerce; and I do hereby declare that the following is a full and exact description of my process of making and preparing the same.

It is well known that rosin-oil is highly useful as a lubricating-oil when combined with other oils; but when so used it gives out a pungent, peculiar, and disagreeable odor, which remains long about the clothes and persons of those who are employed where it is used. My invention consists of a preparation of rosin-oil free from this peculiar odor, and the following is the process by which I make it:

I combine the oily product of the distillation of rosin with an alkaline, earthy, or metallic base by heating in an open kettle with constant stirring. I use and prefer lime fresh slaked, in the proportion of one pound, or thereabout, of lime to one gallon of the oily product. When I use other bases—as alumina, magnesia, potash, or soda—I use them in the proportion which their atomic weights bear to that of lime. The mixture thus made begins to thicken at a temperature of about 230° Fahrenheit, and is thickest at about 260° Fahrenheit. It then gradually becomes thin and liquid, and after being kept heated for about eight hours a glutinous mass is formed at a temperature of about 360° Fahrenheit, which, on being allowed to cool, becomes a plastic substance, diaphorous in thin slices, flexible, and somewhat elastic. I then distil the compound thus formed. If the oil resulting from this distillation is not sufficiently deodorized, I redistill; but generally a second distillation is not necessary. By this process a rosin-oil is produced free from the peculiar and offensive odor which characterizes the rosin-oil of commerce, and fit to be combined with sperm or other oil for the purposes of lubrication.

I do not confine my claim to the use of lime as a base in the above process, although I prefer it. Alumina, magnesia, potash, or soda, or oxide of lead may be used in the proportion which their atomic weights bear to that of lime.

What I claim as my invention, and desire to have my assignees secure by Letters Patent, is—

The above-described process, or its equivalent, of preparing a rosin-oil free from the peculiar and offensive odor which characterizes the rosin-oil of commerce, by combining, as above described, the fluid formed by the first distillation of rosin or rosin-oil, however produced, with slaked lime or other alkaline, earthy, or metallic base equivalent thereto, as above described, and distilling from the compound thus formed a deodorized preparation of rosin-oil, substantially in the manner above described.

SAML. L. DANA.

Witnesses:
EDWARD TUFTS,
JOHN GIMBOR.